US007280504B2

(12) United States Patent
Sato

(10) Patent No.: US 7,280,504 B2
(45) Date of Patent: Oct. 9, 2007

(54) OFDM TRANSMITTING AND RECEIVING APPARATUS

(75) Inventor: Kazumi Sato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1101 days.

(21) Appl. No.: 10/252,443

(22) Filed: Sep. 24, 2002

(65) Prior Publication Data

US 2003/0090993 A1 May 15, 2003

(30) Foreign Application Priority Data

Sep. 28, 2001 (JP) ............................ 2001-303416

(51) Int. Cl.
*H04Q 7/00* (2006.01)

(52) U.S. Cl. .................... 370/330; 370/208; 370/436; 370/478

(58) Field of Classification Search ................ 370/204, 370/208, 277, 278, 282, 328, 329, 330, 436, 370/437, 478; 455/10, 17
See application file for complete search history.

(56) References Cited

U.S. PATENT DOCUMENTS

| 5,784,363 | A | 7/1998 | Engström et al. | |
|---|---|---|---|---|
| 6,128,276 | A * | 10/2000 | Agee | 370/208 |
| 6,175,550 | B1 | 1/2001 | Van Nee | |
| 6,314,289 | B1 * | 11/2001 | Eberlein et al. | 455/427 |
| 6,351,499 | B1 * | 2/2002 | Paulraj et al. | 375/267 |
| 6,618,454 | B1 * | 9/2003 | Agrawal et al. | 375/347 |
| 6,985,434 | B2 * | 1/2006 | Wu et al. | 370/208 |
| 2002/0122383 | A1 * | 9/2002 | Wu et al. | 370/210 |

FOREIGN PATENT DOCUMENTS

EP 1071251 A2 * 1/2001
EP 1469649 A1 * 10/2004

OTHER PUBLICATIONS

Vadde, V. et al., "Partial Response Signaling for Enhanced Spectral Efficiency and RF Performance in OFDM Systems," IEEE Global Telecommunications Conference, Nov. 2001, vol. 5, pp. 3120-3124.*
Shuangchun, L. et al., "Channel Estimation Based on Pilot Subcarrier in Space-Time Block Coded OFDM System," International Conference on Communication Technology Proceedings, Apr. 2003, vol. 2, pp. 1795-1798.*
H. Rohling, et al., Vehicular Technology Conference, Mobile Technology for the Human Race, XP-010162661, pp. 1589-1593, "Performance of an OFDM-TDMA Mobile Communication System", Apr. 28, 1996.

* cited by examiner

*Primary Examiner*—Chi Pham
*Assistant Examiner*—Donald L Mills
(74) *Attorney, Agent, or Firm*—Oblon, Spivak, McClelland, Maier & Neustadt, P.C.

(57) ABSTRACT

An OFDM transmitting and receiving apparatus where the receiving unit receives an OFDM signal. A computing unit in the receiving unit computes a value of a channel response characteristic of each transmission channel corresponding to subcarriers contained in the received OFDM signal, and obtains a computed value. A comparing unit compares the computed value with a predetermined threshold value, and computes a ratio of the number of the subcarriers including the value of the channel response characteristic higher than the predetermined threshold value, to the number of all the subcarriers, and obtaining a computed ratio. A setting unit sets a transmission condition based on at least the computed ratio. A transmitting unit transmits an OFDM signal based on the transmission condition set.

20 Claims, 10 Drawing Sheets

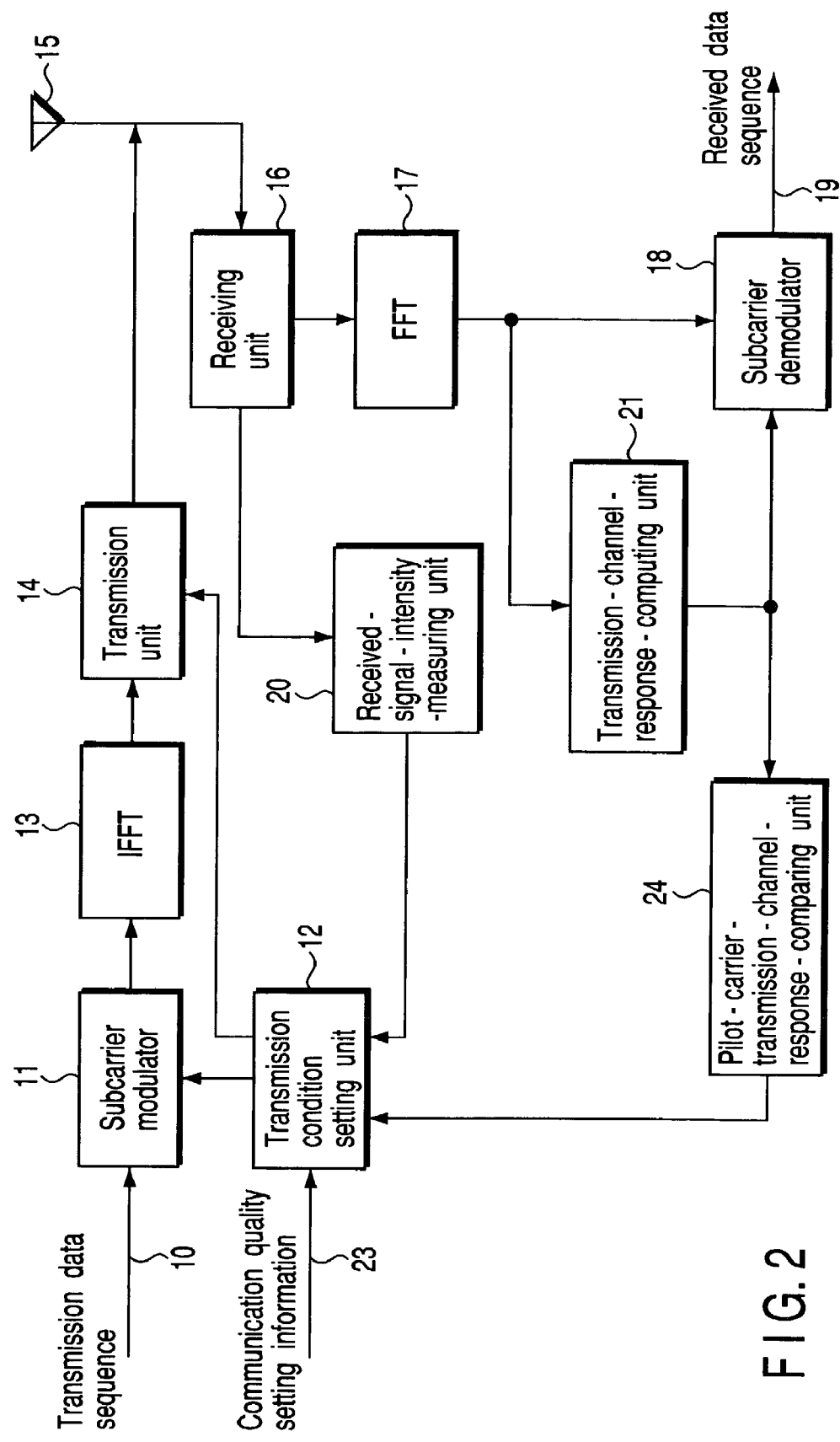
F I G. 2

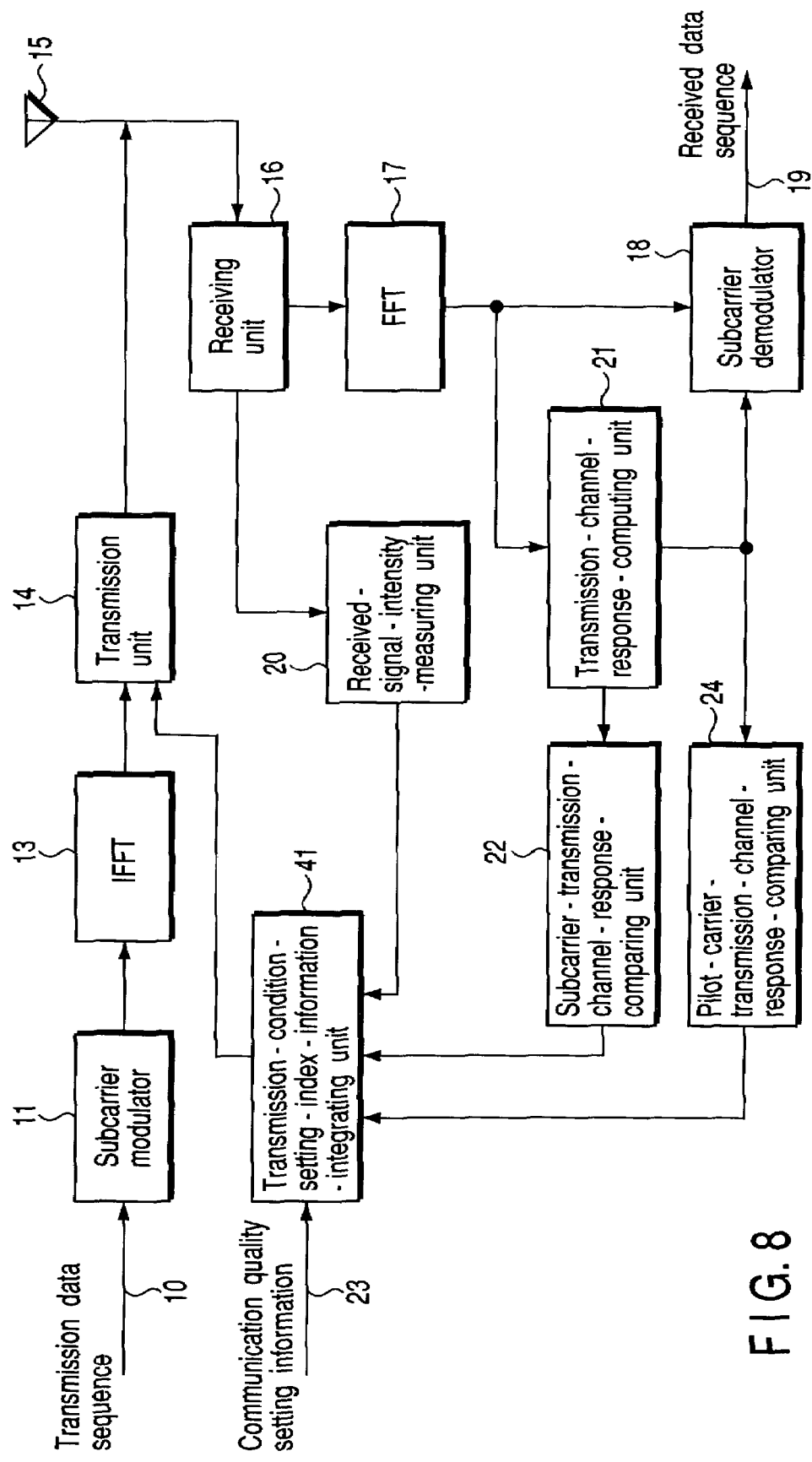
F I G. 8

OFDM TRANSMITTING AND RECEIVING APPARATUS

CROSS-REFERENCE TO RELATED APPLICATIONS

This application is based upon and claims the benefit of priority from the prior Japanese Patent Application No. 2001-303416, filed Sep. 28, 2001, the entire contents of which are incorporated by reference.

BACKGROUND OF THE INVENTION

1. Field of the Invention

The present invention relates to an OFDM transmitting and receiving apparatus for use in a radio communication system for transmitting an OFDM (Orthogonal Frequency Division Multiplexing) signal.

2. Description of the Related Art

In general, in radio communication systems, a signal is transmitted via multipath as a result of wave reflection due to, for example, buildings. Therefore, a received signal is distorted. The distortion varies depending upon place and time. In such radio propagation circumstances, the effective rate of data transmission can accordingly be maximized by changing the transmission conditions such as modulation form, coding rate, etc. Usually, a receiver accesses a known reference signal or data sequence to obtain a received-signal intensity or transmission channel response characteristics, and then the receiver sets transmission conditions suitable for the propagation circumstances.

If a to-be-transmitted signal is a wideband signal such as an OFDM signal, frequency selective fading occurs due to multipath. Upon the occurrence of frequency selective fading, the intensity will differ between OFDM signal subcarriers of different frequencies. Subcarriers of excellent receiving characteristics and subcarriers of degraded receiving characteristics will occur. Because of the existence of subcarriers of degraded received signal characteristics, it is very possible that errors may occur even if the average received signal intensity or transmission channel response characteristics of all subcarriers are high. Accordingly, even if transmission conditions suitable for the average propagation circumstances of the subcarriers are selected, the conditions may not significantly improve the effective data transmission rate.

As described above, in the conventional OFDM transmitting and receiving apparatus, transmission conditions are set in accordance with the average signal intensity or transmission channel response characteristics of all subcarriers. Therefore, if subcarriers of degraded received signal characteristics exist, the effective data transmission rate cannot be enhanced under the set transmission conditions.

BRIEF SUMMARY OF THE INVENTION

It is an object of the invention to provide an OFDM transmitting and receiving apparatus in which the effective data transmission rate is improved by setting optimal transmission conditions in accordance with the transmission channel response characteristics of each subcarrier.

To attain the object, according to a first aspect of the invention, there is provided an OFDM transmitting and receiving apparatus which transmits and receives an OFDM signal including a plurality of subcarriers to and from a destination transmitting and receiving apparatus, the subcarriers being transmitted via respective predetermined transmission channels, comprising:

a receiving unit configured to receive an OFDM signal transmitted from the destination transmitting and receiving apparatus;

a computing unit configured to compute a value of a channel response characteristic of each of transmission channels corresponding to subcarriers contained in the OFDM signal received, and obtain a computed value;

a comparing unit configured to compare the computed value with a predetermined threshold value, and compute a ratio of the number of the subcarriers including the value of the channel response characteristic higher than the predetermined threshold value, to the number of all the subcarriers, and obtain a computed ratio;

a setting unit configured to set a transmission condition based on at least the computed ratio; and a transmitting unit configured to transmit an OFDM signal based on the transmission condition set.

According to a second aspect of the invention, there is provided an OFDM transmitting and receiving apparatus which transmits and receives an OFDM signal including a plurality of subcarriers to and from a destination transmitting and receiving apparatus, the subcarriers including respective transmission channel responses, comprising:

a receiving unit configured to receive an OFDM signal transmitted from the destination transmitting and receiving apparatus;

a computing unit configured to compute a value of a channel response characteristic of each of transmission channels corresponding to subcarriers contained in the OFDM signal received, and obtain a computed value;

a comparing unit configured to compare the computed value with a predetermined threshold value, and compute a ratio of the number of the subcarriers including the value of the channel response characteristic higher than the predetermined threshold value, to all the subcarriers;

a generating unit configured to generate transmission condition setting information which determines a transmission condition which the destination transmitting and receiving apparatus needs when the destination transmitting and receiving apparatus transmits information to the OFDM transmitting and receiving apparatus based on at least the ratio computed by the comparing unit; and a transmitting unit configured to transmit the transmission condition setting information to the destination transmitting and receiving apparatus.

According to a third aspect of the invention, there is provided an OFDM transmitting and receiving apparatus which transmits and receives an OFDM signal including a plurality of subcarriers to and from a destination transmitting and receiving apparatus, the subcarriers including respective transmission channel responses, comprising:

a receiving unit configured to receive an OFDM signal transmitted from the destination transmitting and receiving apparatus;

a computing unit configured to compute a value of a channel response characteristic of each of transmission channels corresponding to subcarriers contained in the OFDM signal received, and obtain a computed value;

a comparing unit configured to compare the computed value with a predetermined threshold value, and compute a ratio of the number of the subcarriers including the value of the channel response characteristic higher than the predetermined threshold value, to all the subcarriers;

an integrating unit configured to integrate information of transmission condition setting indexes based on at least the ratio computed by the comparing unit, the transmission condition setting indexes being referred to set a transmission condition which the destination transmitting and receiving apparatus needs when the destination transmitting and receiving apparatus transmits information to the OFDM transmitting and receiving apparatus; and a transmitting unit configured to transmit the information of the transmission condition setting indexes to the destination transmitting and receiving apparatus.

BRIEF DESCRIPTION OF THE SEVERAL VIEWS OF THE DRAWING

FIG. 2 is a block diagram illustrating an OFDM transmitting and receiving apparatus according to a second embodiment of the invention;

FIG. 8 is a block diagram illustrating an OFDM transmitting and receiving apparatus (originating apparatus) according to a sixth embodiment of the invention;

DETAILED DESCRIPTION OF THE INVENTION

OFDM transmitting and receiving apparatuses according to embodiments of the invention will be described with reference to the accompanying drawings.

The OFDM transmitting and receiving apparatuses according to the embodiments of the invention are used in a mobile radio communication system including a base station and mobile terminals, or a radio LAN system. Each OFDM transmitting and receiving apparatus may be installed in either a mobile terminal or a base station. When the OFDM apparatus is installed in a mobile terminal, a destination transmitting and receiving apparatus may be an OFDM transmitting and receiving apparatus installed in a base station or a destination mobile terminal. When the OFDM apparatus is installed in a base station, the destination transmitting and receiving apparatus is installed in a mobile terminal or another base station.

First Embodiment

Figure 1:
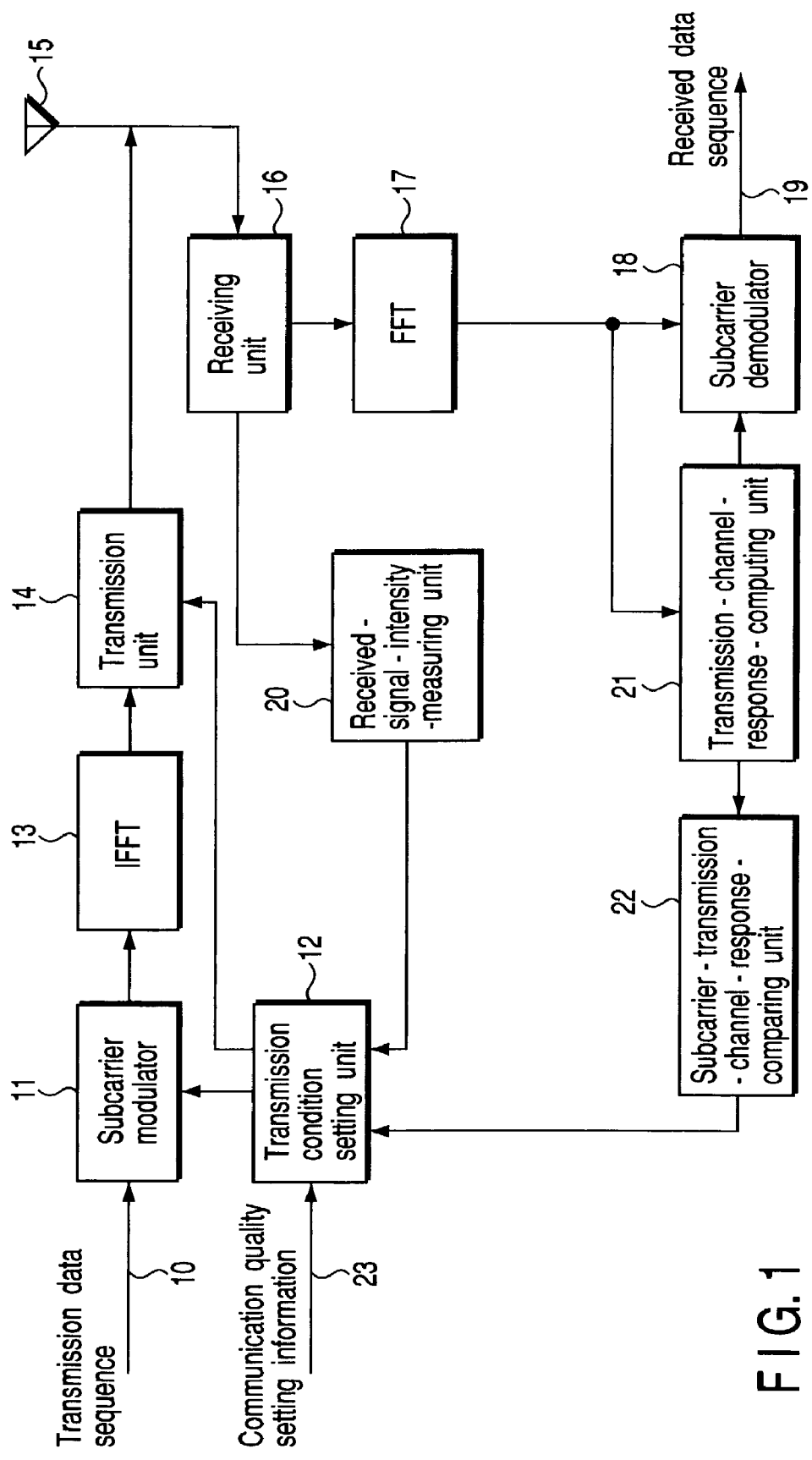
FIG. 1 is a block diagram illustrating an OFDM transmitting and receiving apparatus according to a first embodiment of the invention.

FIG. 1 is a block diagram illustrating an OFDM transmitting and receiving apparatus according to a first embodiment of the invention. In this OFDM transmitting and receiving apparatus, transmission conditions used for transmitting an OFDM signal to a destination transmitting and receiving apparatus are set, using, as transmission condition setting indexes, the intensity of an OFDM signal received by the OFDM transmitting and receiving apparatus (originating apparatus), and a ratio at which the transmission channel response characteristic values of the subcarriers of the OFDM signal exceed a predetermined threshold value.

A description will be given of the transmitter configuration for transmitting an OFDM signal from the OFDM transmitting and receiving apparatus (originating apparatus) of the embodiment to a destination transmitting and receiving apparatus.

A transmission data sequence 10 is input to a subcarrier modulator 11, where the sequence 10 is converted into a plurality of orthogonal subcarriers. The subcarrier modulator 11 generates each subcarrier based on transmission conditions (e.g., modulation form, coding rate, packet length and transmission power) set, as described later, by a transmission condition setting unit 12.

Each subcarrier signal output from the subcarrier modulator 11 is subjected to an IFFT process in an IFFT (Inverse Fast Fourier Transform) unit 13, with the result that each subcarrier signal is converted into a time-varied wave signal. The resultant time-varied wave signals are input to a transmission unit 14. The transmission unit 14 adds, to each time-varied wave signal, a preamble including a known signal sequence, and a guard time, and further converts the resultant signal to an analog signal. After that, the transmission unit 14 subjects the analog signal to frequency conversion in synchronized with a predetermined local oscillation signal, thereby generating an RF-band OFDM signal (OFDM modulation signal). The thus-generated OFDM signal is radiated as a radio wave from an antenna 15. The transmission unit 14 sets, when necessary, transmission power for an OFDM signal, using the transmission condition setting unit 12.

A description will now be given of the receiver configuration of the originating transmitting and receiving apparatus for receiving an OFDM signal transmitted from a destination OFDM transmitting and receiving apparatus.

The antenna 15 receives an OFDM signal transmitted from a destination transmitting and receiving apparatus. The RF-band OFDM signal received by the antenna 15 is input to a receiving unit 16. The receiving unit 16 subjects the received OFDM to frequency conversion, using a predetermined frequency signal, thereby creating a baseband signal. The receiving unit 16 then subjects the resultant signal to analog-to-digital conversion, to time synchronization and to frequency synchronization.

The received OFDM signal as the baseband signal, output from the receiving unit 16, is input to an FFT (Fast Fourier Transform) unit 17. As a result of the synchronization processes in the receiving unit 16, an FFT window used in the FFT unit 17 is set. The FFT unit 17 executes an FFT process in units of FFT windows set in the receiving unit 16, thereby generating received subcarrier signals. A subcarrier demodulator 18 demodulates each subcarrier signal, thereby reproducing a received data sequence 19 identical to a data sequence transmitted from the destination transmitting and receiving apparatus.

The received OFDM signal in the form of an analog wave, or in the form of a digital wave after digital conversion, output from the receiving unit 16, is input to a received-signal-intensity-measuring unit 20, where the intensity of the received signal is measured. Information indicative of the measured signal intensity is input to the transmission condition setting unit 12.

The output of the FFT unit 17 is also input to a transmission-channel-response-computing unit 21. The transmission-channel-response-computing unit 21 computes transmission channel response characteristics, i.e., the response characteristics of each transmission channel from the destination transmitting and receiving apparatus to the originating transmitting and receiving apparatus, using the preamble included in each subcarrier of the received OFDM signal contained in the output of the FFT unit 17. (Each subcarrier includes a preamble and data symbol.) Information on the transmission channel response characteristics, obtained by the transmission-channel-response-computing unit 21, is input to the subcarrier demodulator 18.

In the subcarrier demodulator 18, a data subcarrier, which is contained in the data symbol of each subcarrier contained in the output of the FFT unit 17, is subjected to distortion compensation using the transmission channel response characteristics computed by the transmission-channel-response-computing unit 21. Thus, the data subcarrier is demodulated. In this case, pilot carriers, which are known subcarriers contained in the data symbol, may be used to compensate the distortion of the data subcarrier.

The information on the transmission channel response characteristics computed by the transmission-channel-response-computing unit 21 is also input to a subcarrier-transmission-channel-response-comparing unit 22. The subcarrier-transmission-channel-response-comparing unit 22 compares at least one of the values to be measured as transmission channel characteristics of each subcarrier with a predetermined threshold value, thereby calculating the ratio A of the subcarriers having a value to be measured as channel characteristics higher than the predetermined threshold value to all subcarriers. The values to be measured as channel characteristics are, for example, amplitude, power and distortion (the degree of phase rotation) values. More specifically, the subcarrier-transmission-channel-response-comparing unit 22 uses, as the threshold value, an amplitude attenuation, power attenuation, or phase rotation value, etc., as the average transmission channel response characteristics of all subcarriers. However, it is not always necessary for the subcarrier-transmission-channel-response-comparing unit 22 to compare a transmission channel response characteristic value of each subcarrier with a threshold value. Supposing that the transmission channel response characteristics of neighboring subcarriers are similar, at least one transmission channel response characteristic value of every few subcarriers may be compared with a predetermined threshold value.

The output of the subcarrier-transmission-channel-response-comparing unit 22, i.e., the information indicative of the ratio A of the subcarriers having values to be measured as channel characteristics higher than a threshold value to all subcarriers, is input to the transmission condition setting unit 12. The transmission condition setting unit 12 sets transmission conditions, using, as transmission condition setting indexes, the ratio A computed by the subcarrier-transmission-channel-response-comparing unit 22, and the intensity of the received signal measured by the received-signal-intensity-measuring unit 20. Further, the transmission condition setting unit 12 sets transmission conditions with reference to communication quality setting information 23, when necessary.

The transmission conditions are, for example, modulation form, coding rate for error correction coding, packet length and transmission power, which are used when the OFDM transmitting and receiving apparatus as the originating apparatus transmits an OFDM signal. The transmission condition setting unit 12 sets at least one of the transmission conditions based on the ratio A of the subcarriers having a value to be measured as channel characteristics higher than a threshold value to all subcarriers, and the intensity of the received signal measured by the received-signal-intensity-measuring unit 20. The transmission condition setting method employed in the transmission condition setting unit 12 will be described in more detail.

TABLE 1

| | Received-signal intensity | | | | | |
|---|---|---|---|---|---|---|
| | <−70 dBm | | ≧−70 dBm, <−50 dBm | | ≧−50 dBm | |
| Ratio A | <30% | ≧30% | <30% | ≧30% | <30% | ≧30% |
| Modulation form | BPSK | QPSK | BPSK | QPSK | QPSK | 16QAM |
| Coding rate | r = 1/2 | r = 1/2 | r = 3/4 | r = 3/4 | r = 1/2 | r = 1/2 |

Table 1 shows specific condition examples for use in the transmission condition setting method employed in the embodiment. The intensity of a received signal is classified into, for example, three ranges—a range of less than −70 dBm, a range of −70 dBm to −50 dBm, and a range of −50 dBm or more. The ratio A of the subcarriers having values to be measured as channel characteristics higher than a threshold value to all subcarriers is classified into, for example, two ranges—a range of less than 30% and a range of 30% or more. Such classification enables an appropriate modulation form and coding rate.

In the case of table 1, the lower the intensity of a received OFDM signal, the higher the capability of noise suppression of the modulation form employed, and the lower the coding rate. More specifically, BPSK (Binary Phase Shift Keying), QPSK (Quadrature Phase Shift Keying) and 16QAM (16 Quadrature Amplitude Modulation) are prepared as modulation forms, the noise suppression capability being expressed by: BPSK>QPSK>16QAM. Thus, the selection of the modulation form and coding rate in accordance with the intensity of a received signal enables a stable communication quality and higher effective transmission rate.

Moreover, the addition, as another transmission condition setting index, of the ratio A of the subcarriers having a value to be measured as channel characteristics higher than a threshold value to all subcarriers enables a modulation form with a higher capability of noise suppression and also enables the coding rate to be lowered, in a case where there are subcarriers having degraded transmission channel response characteristics, i.e., receiving characteristics. This means that even if significant frequency selective fading occurs because of degraded propagation circumstances, a stable communication quality can be provided and hence the effective data transmission rate can be significantly increased.

The transmission condition setting unit 12 may also set the packet length or transmission power based on the intensity of a received signal, or the ratio A of the subcarriers having a value to be measured as channel characteristics higher than a threshold value to all subcarriers. In this case, the unit 12 reduces the packet length or increases the transmission power, as the intensity of a received signal or the ratio A is reduced. This can provide the same advantage as above. Thus, it is sufficient if at least one of the modulation form, coding rate for error correction coding, packet length and transmission power is set as a transmission condition, using, as a transmission condition setting index, the intensity of a received signal or the ratio A.

TABLE 2

|  |  | Received-signal intensity | | | | | |
| --- | --- | --- | --- | --- | --- | --- | --- |
|  |  | <−70 dBm | | $\geq$−70 dBm, <−50 dBm | | $\geq$−50 dBm | |
| Ratio A |  | <30% | $\geq$30% | <30% | $\geq$30% | <30% | $\geq$30% |
| PER <$10^{-2}$ | Modulation form | BPSK | BPSK | BPSK | QPSK | BPSK | QPSK |
|  | Coding rate | r = 1/2 | r = 1/2 | r = 1/2 | r = 1/2 | r = 3/4 | r = 3/4 |
| PER $\geq 10^{-2}$ | Modulation form | BPSK | QPSK | BPSK | QPSK | QPSK | 16QAM |
|  | Coding rate | r = 1/2 | r = 1/2 | r = 3/4 | r = 3/4 | r = 1/2 | r = 1/2 |

Table 2 shows other specific condition examples for use in the transmission condition setting method employed in the embodiment. In this case, the transmission conditions (the modulation form, coding rate, etc.) are set in consideration of the requested communication quality, as well as the intensity of a received signal and the ratio A.

The requested communication quality is determined from the communication quality setting information 23 shown in FIG. 1. In the case of table 2, it is determined from a packet error rate (PER). The PER is classified into two ranges—a range of 1% or more and a range of less than 1%. As the requested PER is lowered, it is satisfied by the use of a modulation form having a high capability of noise suppression or by reducing the coding rate, as shown in table 2, thereby enhancing the communication quality.

As described above, the transmission conditions are set based on two or all of transmission condition setting indexes—the intensity of a received signal, the ratio A of the subcarriers having a value to be measured as channel characteristics higher than a threshold value to all subcarriers, and a requested communication quality. However, the transmission conditions may be set using solely the ratio A as a transmission condition setting index.

Second Embodiment

Referring to FIG. 2, a second embodiment of the invention will be described. In FIGS. 1 and 2, like reference numerals denote like elements. The OFDM transmitting and receiving apparatus of the second embodiment differs from the first embodiment in that, in the former, the subcarrier-transmission-channel-response-comparing unit 22 shown in FIG. 1 is replaced with a pilot-carrier-transmission-channel-comparing unit 24.

As described in the first embodiment, pilot carriers, which are known subcarriers contained in the data symbol contained in the output of the FFT unit 17, are used for distortion compensation of the data subcarrier of each subcarrier. Accordingly, if the receiving characteristics of each pilot carrier are degraded, those of each subcarrier may be degraded. In the second embodiment, the transmission conditions are set in accordance with the receiving characteristics of the pilot carriers of each subcarrier, thereby stabilizing the communication quality and increasing the effective data transmission rate.

The information on the transmission channel response characteristics of each pilot carrier, contained in the output of the transmission-channel-response-computing unit 21, is input to a pilot-carrier-transmission-channel-response-comparing unit 24. The pilot-carrier-transmission-channel-response-comparing unit 24 compares, with a predetermined threshold value, at least one of the values to be measured as channel characteristics of the transmission channel response characteristics of each pilot carrier, thereby computing the ratio B of the pilot carriers having a value to be measured as channel characteristics higher than the threshold value to all pilot carriers. The values to be measured as channel characteristics are, for example, amplitude, power and phase rotation values, as in the case of the transmission channel response characteristic values of each subcarrier in the first embodiment. In this case, the pilot-carrier-transmission-channel-response-comparing unit 24 uses, as the threshold value, an amplitude attenuation, power attenuation, or phase rotation value, etc., as the average transmission channel response characteristics of all subcarriers or pilot carriers.

The output of the pilot-carrier-transmission-channel-response-comparing unit 24, i.e., the information indicative of the ratio B of the pilot carriers having a value to be measured as channel characteristics higher than the threshold value to all pilot carriers, is input to the transmission condition setting unit 12. The transmission condition setting unit 12 sets transmission conditions, using, as transmission condition setting indexes, the ratio B computed by the pilot-carrier-transmission-channel-response-comparing unit 24, and the intensity of a received signal measured by the received-signal-intensity-measuring unit 20. Further, the transmission condition setting unit 12 sets transmission conditions with reference to communication quality setting information 23, when necessary.

TABLE 3

| | | Received-signal intensity | | | | | |
|---|---|---|---|---|---|---|---|
| | | <-70 dBm | | ≥-70 dBm, <-50 dBm | | ≥-50 dBm | |
| Ratio B | | <50% | ≥50% | <50% | ≥50% | <50% | ≥50% |
| PER <$10^{-2}$ | Modulation form | BPSK | BPSK | BPSK | QPSK | QPSK | QPSK |
| | Coding rate | r = 1/2 | r = 1/2 | r = 3/4 | r = 1/2 | r = 1/2 | r = 3/4 |
| PER ≥$10^{-2}$ | Modulation form | BPSK | QPSK | QPSK | QPSK | QPSK | 16QAM |
| | Coding rate | r = 1/2 | r = 1/2 | r = 1/2 | r = 3/4 | r = 3/4 | r = 1/2 |

Table 3 shows further specific condition examples for use in the transmission condition setting method employed in the transmission condition setting unit 12 of the second embodiment. The intensity of a received signal is classified into, for example, three ranges—a range of less than −70 dBm, a range of −70 dBm to −50 dBm, and a range of −50 dBm or more, as in the cases of tables 1 and 2. The ratio B of the pilot carriers having a value to be measured as channel characteristics higher than the threshold value to all pilot carriers is classified into, for example, two ranges—a range of less than 50% and a range of 50% or more. Such classification enables an appropriate modulation form and coding rate.

In other words, in the embodiment, the lower the intensity of a received OFDM signal, the higher the capability of noise suppression of the modulation form employed, and the lower the coding rate. As a result, a stable communication quality can be provided and hence the effective data transmission rate can be increased.

Moreover, the addition, as another transmission condition setting index, of the ratio B of the pilot carriers having a value to be measured as channel characteristics higher than a threshold value to all pilot carriers enables a modulation form of a higher capability of noise suppression and also enables the coding rate to be lowered, in a case where there are pilot carriers having degraded transmission channel response characteristics, i.e., receiving characteristics. This means that even if significant frequency selective fading occurs because of degraded propagation circumstances, a stable communication quality can be provided and hence the effective data transmission rate can be significantly increased.

Furthermore, as shown in table 3, the requested communication quality is defined using the PER. Depending upon whether the requested PER is not less than 1% or more than 1%, the transmission conditions may be changed. In other words, the quality of communication can be stabilized by the use of a modulation form having a high capability of noise suppression or by reducing the coding rate.

The transmission condition setting unit 12 may also set the packet length or transmission power based on the intensity of a received signal, or the ratio B of the pilot carriers having a value to be measured as channel characteristics higher than a threshold value to all pilot carriers. In this case, the unit 12 can provide the same advantage as above by reducing the packet length or increasing the transmission power, as the intensity of a received signal or the ratio B is reduced. Thus, it is sufficient if at least one of the modulation form, coding rate for error correction coding, packet length and transmission power is set as a transmission condition, using, as a transmission condition setting index, the intensity of a received signal or the ratio B.

In addition, in the second embodiment, the transmission conditions are set based on two or all of transmission condition setting indexes—the intensity of a received signal, the ratio B of the pilot carriers having a value to be measured as channel characteristics higher than a threshold value to all pilot carriers, and a requested communication quality. However, the transmission conditions may be set using solely the ratio B as a transmission condition setting index.

Third Embodiment

Figure 3:
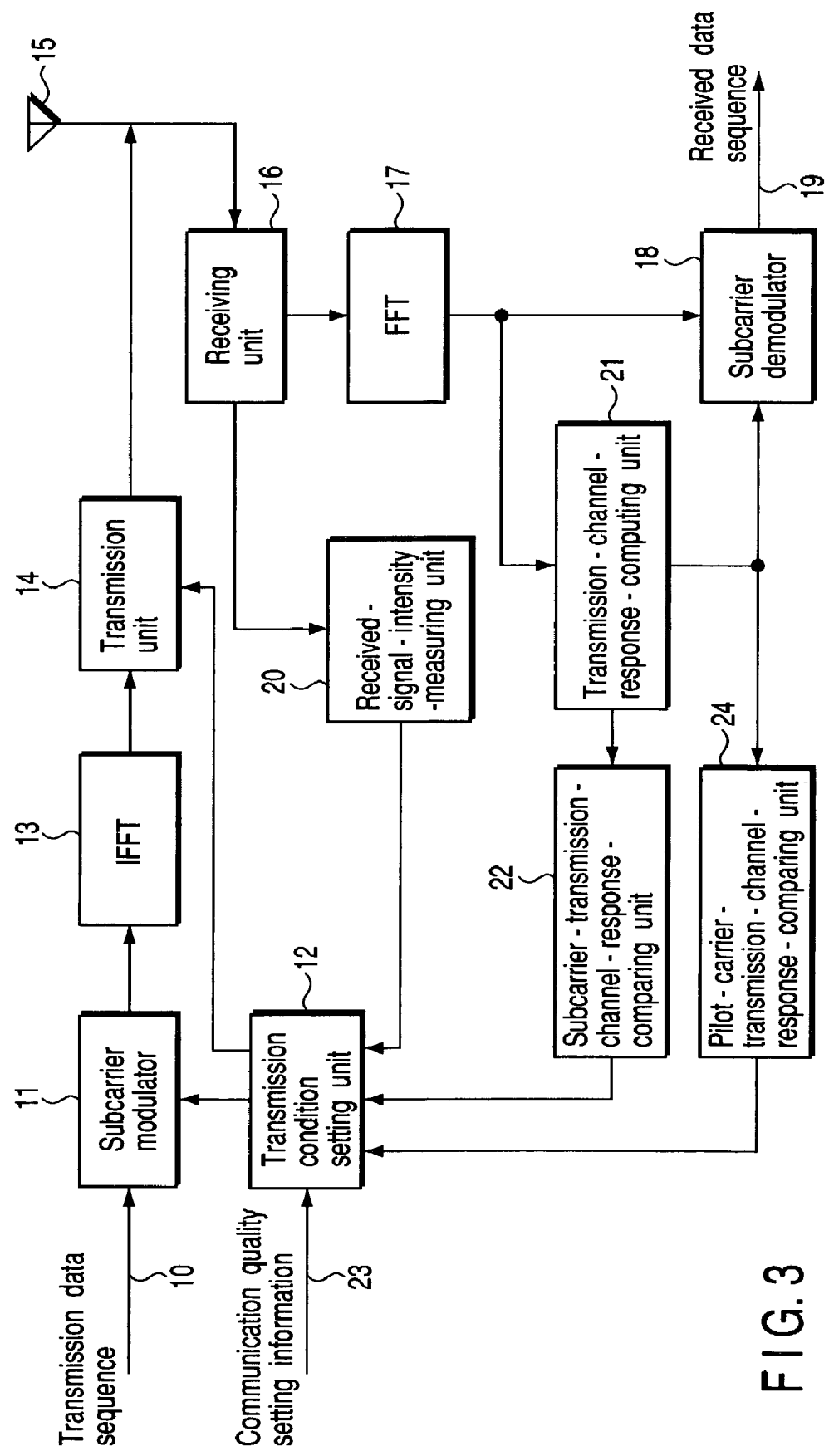
FIG. 3 is a block diagram illustrating an OFDM transmitting and receiving apparatus according to a third embodiment of the invention.

Referring to FIG. 3, an OFDM transmitting and receiving apparatus according to a third embodiment of the invention will be described. In FIGS. 1, 2 and 3, like reference numerals denote like elements. The OFDM transmitting and receiving apparatus of the third embodiment is obtained by combining the first and second embodiments.

Specifically, the information, which indicates the transmission channel response characteristics of each subcarrier and is contained in the output of the transmission-channel-response-computing unit 21, is input to the subcarrier-transmission-channel-response-comparing unit 22. Similarly, the information, which indicates the transmission channel response characteristics of each pilot carrier and is contained in the output of the transmission-channel-response-computing unit 21, is input to the pilot-carrier-transmission-channel-response-comparing unit 24. The subcarrier-transmission-channel-response-comparing unit 22 compares a value to be measured as transmission channel characteristics of each subcarrier with a first threshold value, thereby computing the ratio of the subcarriers having a value to be measured as channel characteristics higher than the first threshold value to all subcarriers. On the other hand, the pilot-carrier-transmission-channel-response-comparing unit 24 compares a value to be measured as transmission channel characteristics of each pilot carrier with a second threshold value, thereby computing the ratio of the pilot carriers having a value to be measured as channel characteristics higher than the second threshold value to all pilot carriers.

The transmission condition setting unit 12 sets transmission conditions, using, as transmission condition setting indexes, the ratios A and B computed by the subcarrier-transmission-channel-response comparing unit 22 and pilot-carrier-transmission-channel-response-comparing unit 24, respectively, and the intensity of a received signal measured by the received-signal-intensity-measuring unit 20. Further, the transmission condition setting unit 12 sets transmission conditions with reference to communication quality setting information 23, when necessary.

TABLE 4

| | Received-signal intensity | | | | | | | | | | | |
|---|---|---|---|---|---|---|---|---|---|---|---|---|
| | <-70 dBm | | | | ≥-70 dBm, <-50 dBm | | | | ≥-50 dBm | | | |
| Ratio A | <30% | | ≥30% | | <30% | | ≥30% | | <30% | | ≥30% | |
| Ratio B | <50% | ≥50% | <50% | ≥50% | <50% | ≥50% | <50% | ≥50% | <50% | ≥50% | <50% | ≥50% |
| Modulation form | BPSK | BPSK | BPSK | QPSK | BPSK | QPSK | QPSK | 16QAM | QPSK | QPSK | QPSK | 16QAM |
| Coding rate | r = 1/2 | r = 3/4 | r = 1/2 | r = 1/2 | r = 3/4 | r = 1/2 | r = 1/2 | r = 1/2 | r = 1/2 | r = 3/4 | r = 3/4 | r = 3/4 |

Table 4 shows other specific condition examples for use in the transmission condition setting method employed in the transmission condition setting unit 12 of the third embodiment. The intensity of a received signal is classified into, for example, three ranges—a range of less than–70 dBm, a range of –70 dBm to –50 dBm, and a range of –50 dBm or more, as in the cases of tables 1, 2 and 3. The ratio A of the subcarriers having a value to be measured as channel characteristics higher than the first threshold value to all subcarriers is classified into, for example, two ranges—a range of less than 30% and a range of 30% or more, as in the cases of tables 1 and 2. Further, the ratio B of the pilot carriers having a value to be measured as channel characteristics higher than the second threshold value to all pilot carriers is classified into, for example, two ranges—a range of less than 50% and a range of 50% or more, as in the case of table 3.

In accordance with the above-mentioned classification, the lower the intensity of a received OFDM signal, the higher the capability of noise suppression of the modulation form employed, and the lower the coding rate. As a result, a stable communication quality can be provided and hence the effective data transmission rate can be increased. Moreover, the addition, as other transmission condition setting indexes, of the ratio A of the subcarriers having a value to be measured as channel characteristics higher than the first threshold value to all subcarriers, and the ratio B of the pilot carriers having a value to be measured as channel characteristics higher than the second threshold value to all pilot carriers, enables a modulation form with a much higher capability of noise suppression and also enables the coding rate to be further lowered, in a case where there are subcarriers and/or pilot carriers having degraded transmission channel response characteristics, i.e., receiving characteristics. This means that even if significant frequency selective fading occurs because of degraded propagation circumstances, a stable communication quality can be provided and hence the effective data transmission rate can be significantly increased.

Table 5 shows further specific condition examples for use in the transmission condition setting method employed in the transmission condition setting unit 12 of the third embodiment. In this case, the transmission conditions (the modulation form, coding rate, etc.) are set in consideration of the requested communication quality, as well as the intensity of a received signal, the ratio A of the subcarriers having a value to be measured as channel characteristics higher than the first threshold value to all subcarriers, and the ratio B of the pilot carriers having a value to be measured as channel characteristics higher than the second threshold value to all pilot carriers, as shown in table 4. The requested communication quality is determined from the PER as in the cases of tables 2 and 3. The requested PER is classified into two ranges—a range of 1% or more and a range of less than 1%. As the requested PER is lowered, it is satisfied by the use of a modulation form having a high capability of noise suppression or by reducing the coding rate, thereby enhancing the communication quality.

The transmission condition setting unit 12 may also set the packet length or transmission power based on the intensity of a received signal, the ratio A of the subcarriers having a value to be measured as channel characteristics higher than the first threshold value to all subcarriers, and the ratio B of the pilot carriers having a value to be measured as channel characteristics higher than the second threshold value to all pilot carriers. In this case, the unit 12 reduces the packet length or increases the transmission power, as the intensity of a received signal or the ratio A or B is reduced. This can provide the same advantage as above. Thus, it is sufficient if at least one of the modulation form, coding rate for error correction coding, packet length and transmission power is set as a transmission condition, using, as a transmission condition setting index, the intensity of a received signal, or the ratio A or B.

In addition, in the third embodiment, the transmission conditions are set based on three or all of transmission condition setting indexes—the intensity of a received signal, the ratio A of the subcarriers having a value to be measured

TABLE 5

| | | Received-signal intensity | | | | | | | | | | | |
|---|---|---|---|---|---|---|---|---|---|---|---|---|---|
| | | <-70 dBm | | | | ≥-70 dBm, <-50 dBm | | | | ≥-50 dBm | | | |
| Ratio A | | <30% | | ≥30% | | <30% | | ≥30% | | <30% | | ≥30% | |
| Ratio B | | <50% | ≥50% | <50% | ≥50% | <50% | ≥50% | <50% | ≥50% | <50% | ≥50% | <50% | ≥50% |
| PER <10$^{-2}$ | Modulation form | BPSK | BPSK | BPSK | BPSK | BPSK | BPSK | BPSK | QPSK | BPSK | QPSK | 16QAM | 16QAM |
| | Coding rate | r = 1/2 | r = 1/2 | r = 1/2 | r = 3/4 | r = 1/2 | r = 3/4 | r = 3/4 | r = 3/4 | r = 3/4 | r = 1/2 | r = 1/2 | r = 1/2 |
| PER ≥10$^{-2}$ | Modulation form | BPSK | BPSK | BPSK | QPSK | BPSK | QPSK | QPSK | 16QAM | QPSK | QPSK | QPSK | 16QAM |
| | Coding rate | r = 1/2 | r = 3/4 | r = 1/2 | r = 1/2 | r = 3/4 | r = 1/2 | r = 1/2 | r = 1/2 | r = 1/2 | r = 3/4 | r = 3/4 | r = 3/4 | as channel characteristics higher than a first threshold value to all subcarriers, the ratio B of the pilot carriers having a value to be measured as channel characteristics higher than a second threshold value to all pilot carriers, and a requested communication quality. However, the transmission conditions may be set using solely the ratios A and B as transmission condition setting indexes.

Other embodiments of the invention will now be described.

In the first through third embodiments, transmission condition setting indexes (the intensity of a received signal, the ratios A and B. and a requested communication quality, etc.) are obtained based on an OFDM signal transmitted from a destination transmitting and receiving apparatus to an originating transmitting and receiving apparatus, and transmission conditions are set using these indexes. The first through third embodiments are suitable for a case where the transmission channel response characteristics assumed during transmission from the originating apparatus to the destination apparatus are substantially the same as those assumed during transmission from the destination apparatus to the originating apparatus (for example, a case where the originating and destination apparatuses use the same transmission frequency band).

If, on the other hand, the former transmission channel response characteristics differ from the latter ones, it is sufficient if transmission condition setting indexes for setting transmission conditions assumed during transmission from the destination apparatus to the originating apparatus are obtained based on an OFDM signal transmitted from the destination apparatus to the originating apparatus, thereby setting the transmission conditions of the destination apparatus. Fourth through sixth embodiments described later are directed to such a case.

Fourth Embodiment

Figure 4:
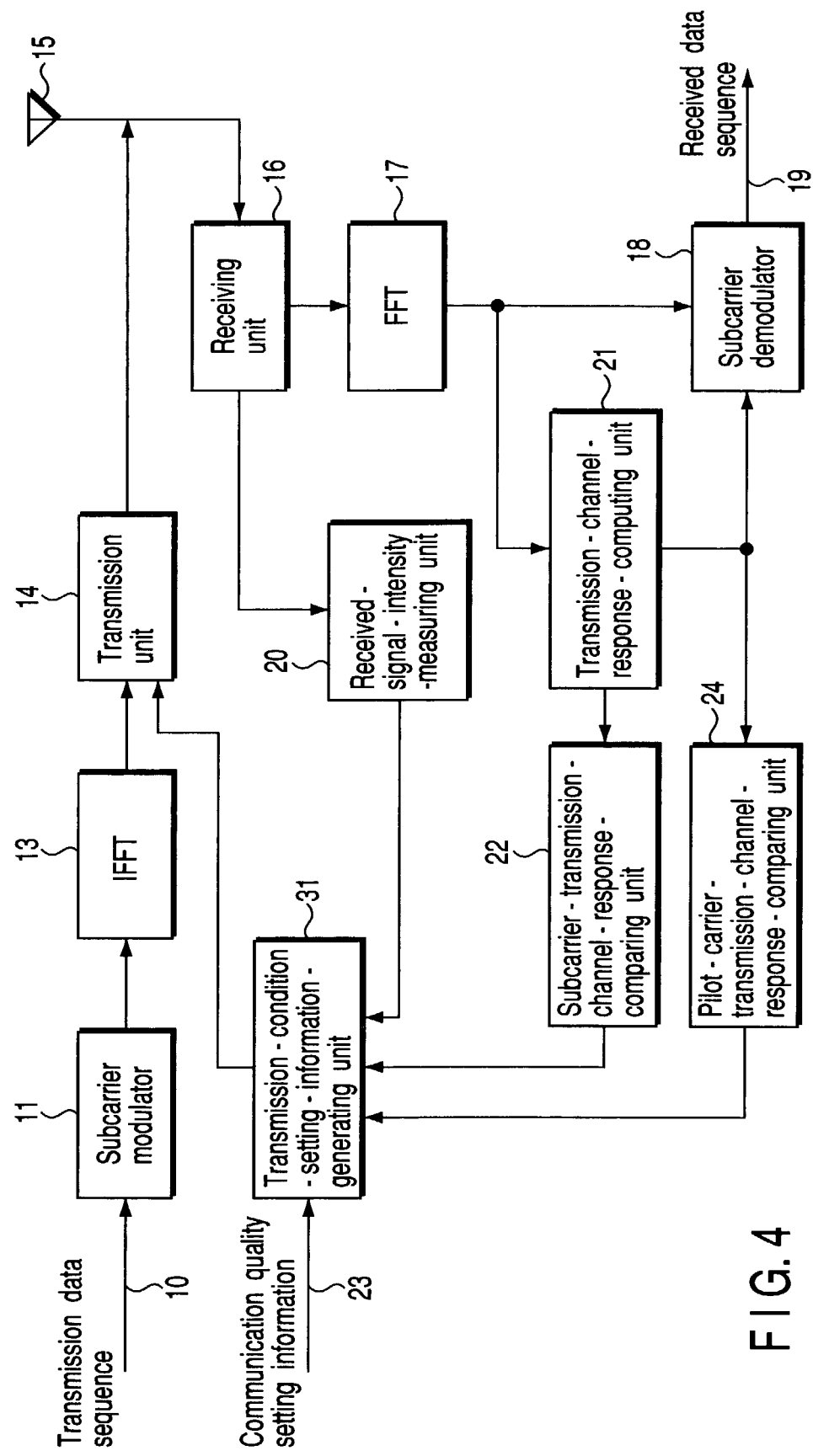
FIG. 4 is a block diagram illustrating an OFDM transmitting and receiving apparatus (originating apparatus) according to a fourth embodiment of the invention.

FIG. 4 illustrates an OFDM transmitting and receiving apparatus (originating apparatus) according to a fourth embodiment of the invention. This apparatus is obtained by modifying the third embodiment shown in FIG. 3. In FIGS. 3 and 4, like reference numerals denote like elements. The fourth embodiment differs from the third embodiment only in that, in the former, the transmission condition setting unit 12 in FIG. 3 is replaced with a transmission-condition-setting-information-generating unit 31, and transmission condition setting information as the output of the unit 31 is input to the transmission unit 14.

The transmission-condition-setting-information-generating unit 31 inputs, as transmission condition indexes, the outputs of the received-signal-intensity-measuring unit 20, subcarrier-transmission-channel-response-comparing unit 22, and pilot-carrier-transmission-channel-response-comparing unit 24. Based on the input transmission condition setting indexes, the unit 31 obtains transmission conditions (modulation form, coding rate, packet length, and transmission power, etc.) used when a destination transmitting and receiving apparatus transmits a signal to the OFDM transmitting and receiving apparatus of the embodiment (originating apparatus), by the same procedure as executed by the transmission condition setting unit 12 of the third embodiment. Based on the obtained transmission conditions, the transmission-condition-setting-information-generating unit 31 generates transmission condition setting information for enabling the destination apparatus to set its transmission conditions. The thus-generated transmission condition setting information is transmitted to the destination transmitting and receiving apparatus via the transmission unit 14. The destination apparatus, in turn, sets transmission conditions based on the transmitted transmission condition setting information.

Figure 5:
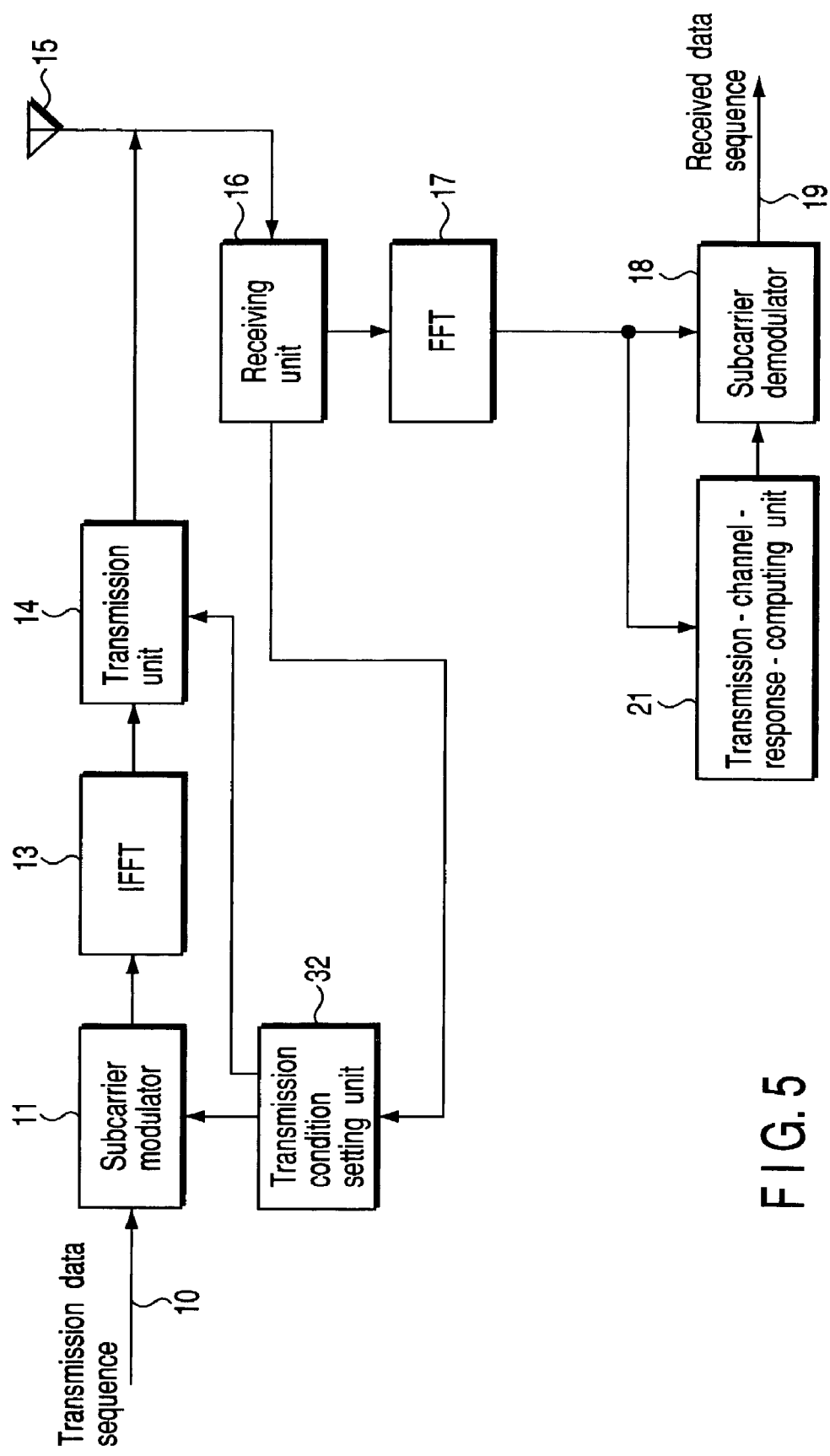
FIG. 5 is a block diagram illustrating an OFDM transmitting and receiving apparatus (destination apparatus) according to the fourth embodiment of the invention.

FIG. 5 illustrates an OFDM transmitting and receiving apparatus as a destination apparatus according to the fourth embodiment of the invention. The transmission condition setting information transmitted from the OFDM transmitting and receiving apparatus shown in FIG. 4 is input to a transmission condition setting unit 32 via an antenna 15 and receiving unit 16. In accordance with the input transmission condition setting information, the transmission condition setting unit 32 sets a modulation form and/or coding rate for a subcarrier modulator 11, and a transmission power for a transmission unit 14.

As described above, in the fourth embodiment, the received-signal-intensity-measuring unit 20, subcarrier-transmission-channel-response-comparing unit 22, and pilot-carrier-transmission-channel-response-comparing unit 24, which are incorporated in the originating transmitting and receiving apparatus of FIG. 4, obtain transmission condition setting indexes for enabling the destination transmitting and receiving apparatus to transmit a signal to the originating OFDM transmitting and receiving apparatus. Based on the transmission condition setting indexes, the transmission-condition-setting-information-generating unit 31 generates transmission condition setting information for enabling the destination transmitting and receiving apparatus to set its transmission conditions. The transmission unit 14 transmits the generated transmission condition setting information to the destination transmitting and receiving apparatus of FIG. 5. The destination transmitting and receiving apparatus, in turn, sets transmission conditions based on the transmitted transmission condition setting information.

Thus, the destination transmitting and receiving apparatus does not execute an operation for generating transmission condition setting information for setting transmission conditions. In other words, the transmission condition setting information is generated by the originating transmitting and receiving apparatus.

Accordingly, even if the transmission channel response characteristics assumed during transmission from the originating apparatus to the destination apparatus differ from those assumed during transmission from the destination apparatus to the originating apparatus, the destination apparatus can set optimal transmission conditions, and hence obtain the same advantage as that obtained in the third embodiment.

In other words, the destination transmitting and receiving apparatus of FIG. 5 can provide a stable communication quality by using a modulation form having a higher capability of noise suppression or reducing the coding rate, as the intensity of a signal received by the originating transmitting and receiving apparatus of FIG. 4 is reduced. As a result, the effective data transmission rate of the destination apparatus can be enhanced. Moreover, the addition, as transmission condition setting indexes, of the ratio A of the subcarriers having a predetermined characteristic value higher than the first threshold value to all subcarriers, and the ratio B of the pilot carriers having a value to be measured as channel characteristics higher than the second threshold value to all pilot carriers, enables a modulation form with a much higher capability of noise suppression and also enables the coding rate to be further lowered, in a case where there are subcarriers and/or pilot carriers having degraded transmission channel response characteristics, i.e., receiving characteristics. This means that even if significant frequency selective fading occurs because of degraded propagation circumstances, a stable communication quality can be provided and hence the effective data transmission rate can be significantly increased.

In the fourth embodiment, the transmission conditions are set, as in the third embodiment, based on three or all of transmission condition setting indexes—the intensity of a received signal, the ratio A of the subcarriers having a value to be measured as channel characteristics higher than a first threshold value to all subcarriers, the ratio B of the pilot carriers having a value to be measured as channel characteristics higher than a second threshold value to all pilot carriers, and a requested communication quality. However, the transmission conditions may be set using solely the ratios A and B as transmission condition setting indexes.

Fifth Embodiment

Figure 6:
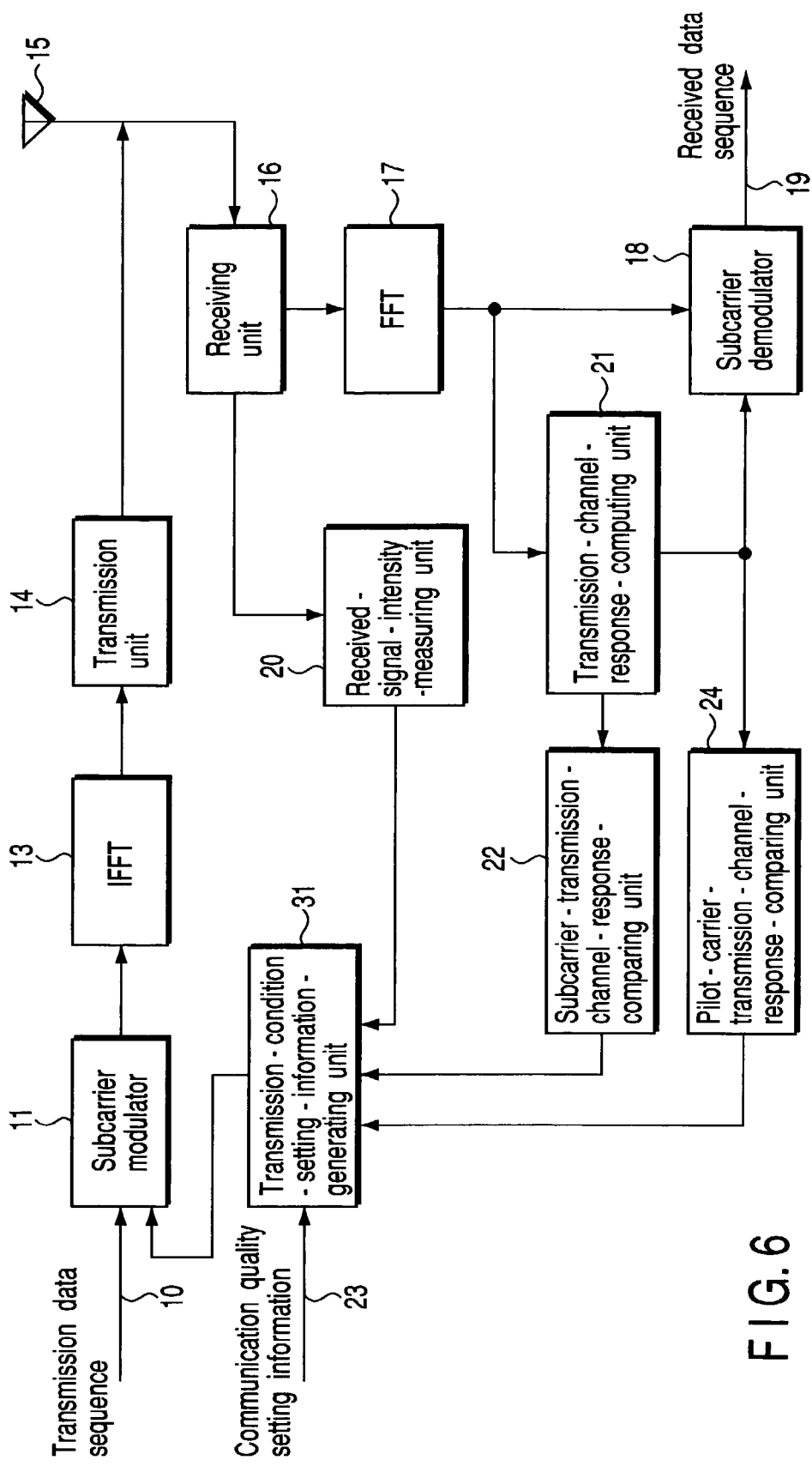
FIG. 6 is a block diagram illustrating an OFDM transmitting and receiving apparatus (originating apparatus) according to a fifth embodiment of the invention.

FIG. 6 illustrates an OFDM transmitting and receiving apparatus (originating apparatus) according to a fifth embodiment of the invention. This apparatus is obtained by modifying the fourth embodiment shown in FIG. 4. In FIGS. 4 and 6, like reference numerals denote like elements. The fifth embodiment differs from the fourth embodiment only in that, in the former, the output of the transmission-condition-setting-information-generating unit 31 is not input to the transmission unit 14 but to the subcarrier modulator 11.

Figure 7:
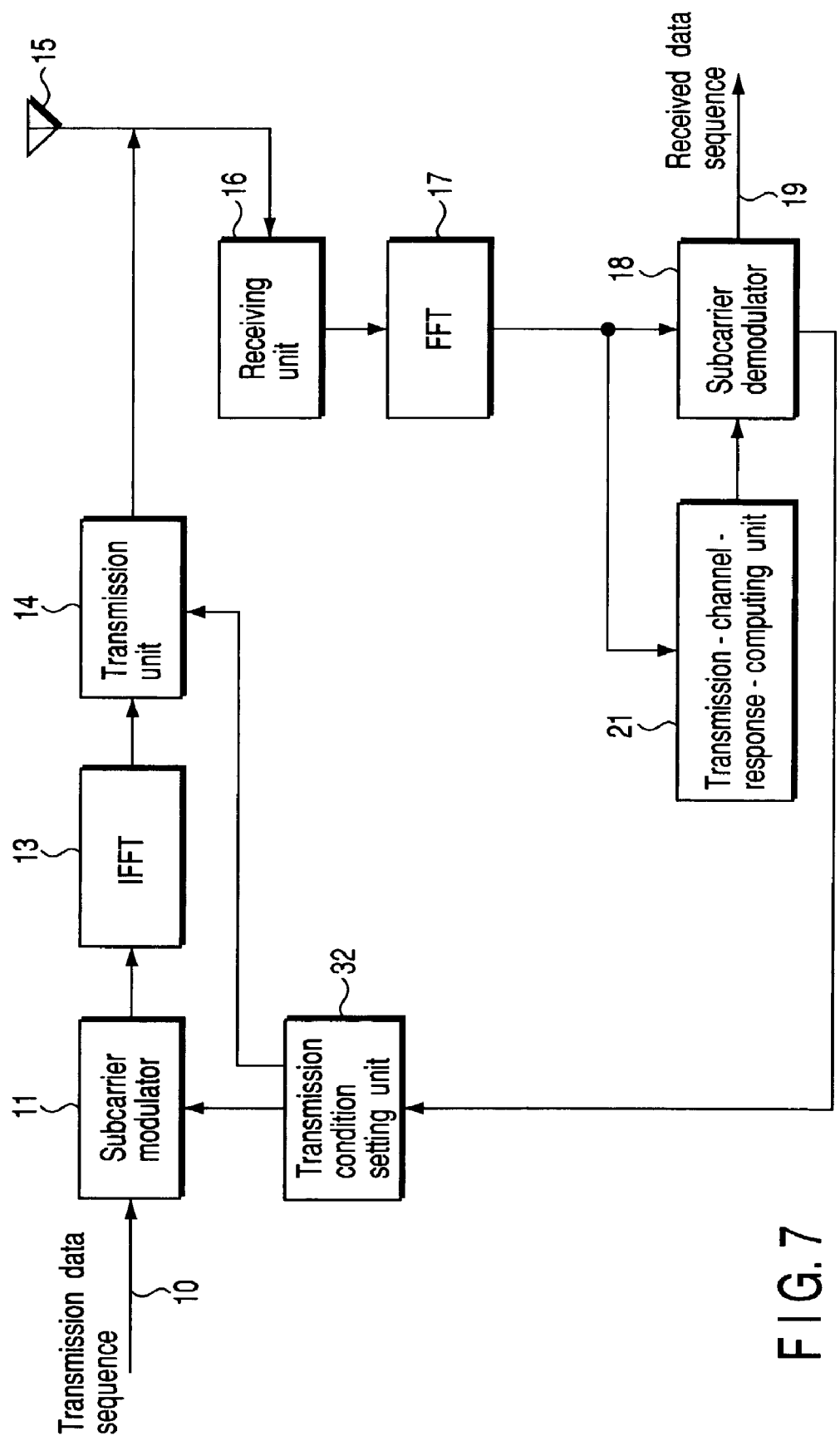
FIG. 7 is a block diagram illustrating an OFDM transmitting and receiving apparatus (destination apparatus) according to the fifth embodiment of the invention.

FIG. 7 illustrates an OFDM transmitting and receiving apparatus as a destination apparatus according to the fifth embodiment of the invention. In FIGS. 5 and 7, like reference numerals denote like elements. The configuration of FIG. 7 differs from that of FIG. 5 only in that, in the former, transmission condition setting information is extracted from the output of the subcarrier demodulator 18 (this process corresponds to that executed by the originating apparatus of FIG. 6, in which the transmission condition setting information is input to the subcarrier modulator 11) and is input to the transmission condition setting unit 32.

As described above, the transmission condition setting information may be transmitted via the subcarrier modulator 11 and subcarrier demodulator 18. This case can provide the same advantage as the fourth embodiment.

Sixth Embodiment

FIG. 8 illustrates an OFDM transmitting and receiving apparatus (originating apparatus) according to a sixth embodiment of the invention. This apparatus is obtained by modifying the third embodiment of FIG. 3. In FIGS. 3 and 8, like reference numerals denote like elements. The sixth embodiment differs from the third embodiment only in that, in the former, the transmission condition setting unit 12 in FIG. 3 is replaced with a transmission-condition-setting-index-information-integrating unit 41, and transmission condition setting index information as the output of the unit 41 is input to the transmission unit 14.

The transmission-condition-setting-index-information-integrating unit 41 inputs, as transmission condition setting index information, the outputs of the received-signal-intensity-measuring unit 20, subcarrier-transmission-channel-response-comparing unit 22, and pilot-carrier-transmission-channel-response-comparing unit 24, and synthesizes them. The thus-generated transmission condition setting index information is transmitted to a destination transmitting and receiving apparatus via the transmission unit 14. The destination apparatus sets transmission conditions based on the transmitted transmission condition setting index information.

Figure 9:
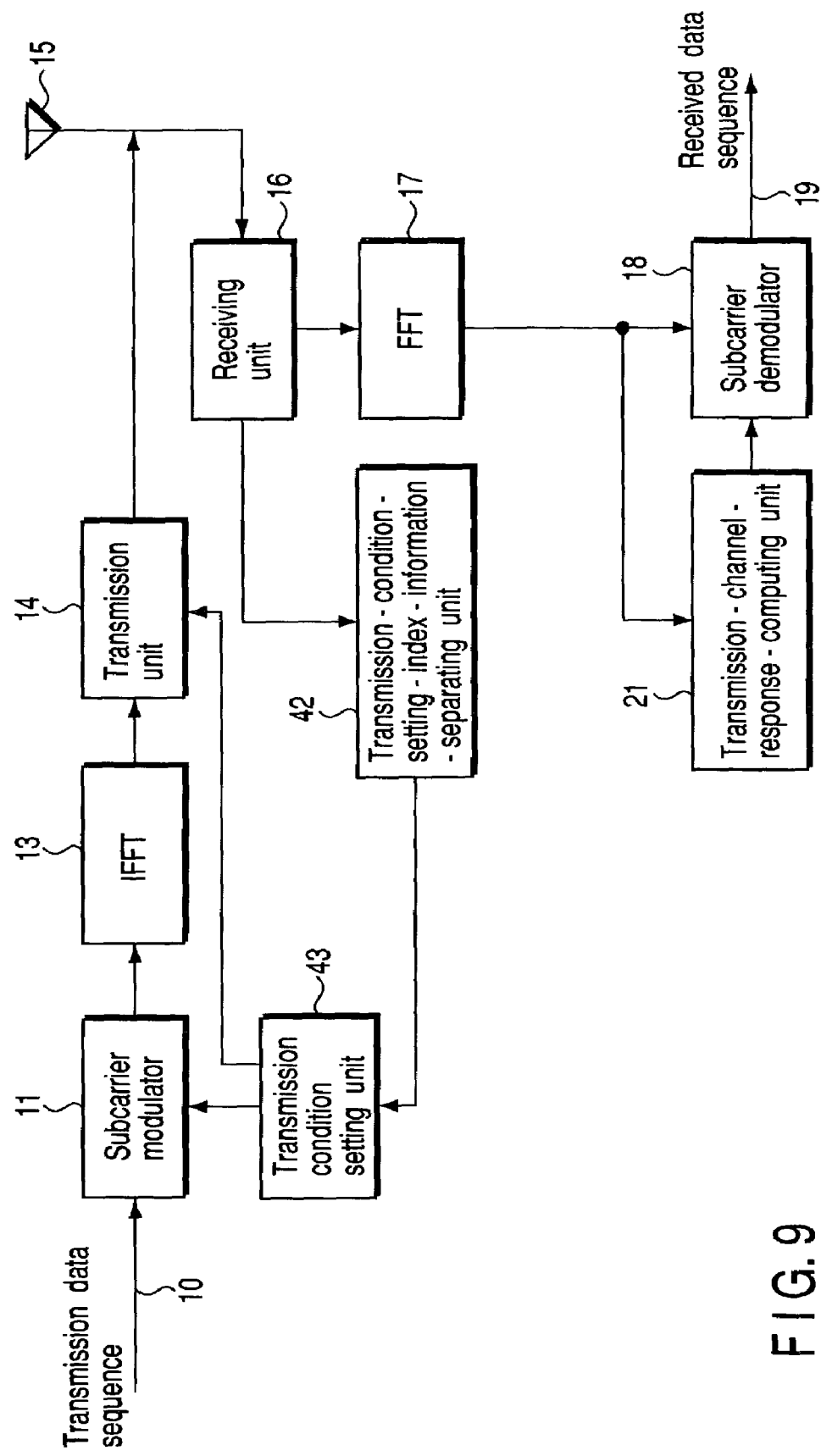
FIG. 9 is a block diagram illustrating an OFDM transmitting and receiving apparatus (destination apparatus) according to the sixth embodiment of the invention.

FIG. 9 illustrates an OFDM transmitting and receiving apparatus as a destination apparatus according to the sixth embodiment of the invention. The transmission condition setting index information transmitted from the OFDM transmitting and receiving apparatus shown in FIG. 8 is input to a transmission-condition-setting-index-information separating unit 42 via an antenna 15 and receiving unit 16, when necessary. Based on the input transmission condition setting index information, the unit 42 sets transmission conditions (modulation form, coding rate and a transmission power, etc.) for transmitting a signal to the OFDM transmitting and receiving apparatus (originating apparatus), in the same manner as the transmission condition setting unit 12 of the third embodiment. Based on the obtained transmission conditions, the transmission-condition-setting-index-information separating unit 42 generates transmission condition setting information for enabling the destination apparatus to set its transmission conditions. After that, the transmission-condition-setting-index-information separating unit 42 outputs the transmission condition setting information to a transmission condition setting unit 43. The transmission condition setting unit 43 sets transmission conditions based on the input transmission condition setting information. Specifically, the transmission condition setting unit 43 sets, as the transmission conditions, modulation form or coding rate for the subcarrier modulator 11, and a transmission power for the transmission unit 14.

As described above, in the sixth embodiment, the transmission unit 14 of the originating transmitting and receiving apparatus of FIG. 8 supplies the destination transmitting and receiving apparatus of FIG. 9 with the transmission condition setting index information for enabling the destination apparatus to set transmission conditions used to transmit a signal, the information indicating the outputs of the received-signal-intensity-measuring unit 20, subcarrier-transmission-channel-response-comparing unit 22, and pilot-carrier-transmission-channel-response-comparing unit 24, which are incorporated in the originating transmitting and receiving apparatus of FIG. 8. Based on the received transmission condition setting index information, the destination apparatus sets transmission conditions. This means that the destination apparatus can set optimal transmission conditions even if the transmission channel response characteristics assumed during transmission from the originating apparatus to the destination apparatus differ from those assumed during transmission from the destination apparatus to the originating apparatus. Thus, the destination transmitting and receiving apparatus can provide the same advantage as the fourth or fifth embodiment.

In the sixth embodiment, the information to be transmitted from the originating apparatus to the destination apparatus is not transmission condition setting information, but transmission condition setting index information. The data amount of the transmission condition setting index information is smaller than that of the transmission condition setting information. Therefore, the sixth embodiment is more advantageous than the fourth and fifth embodiments since the transmission data amount transmitted from the originating apparatus to the destination apparatus is smaller in the sixth embodiment than in the fourth and fifth embodiments.

In the sixth embodiment, the transmission conditions are set, as in the fourth or fifth embodiment, based on three or all of transmission condition setting indexes—the intensity of a received signal, the ratio A of the subcarriers having a value to be measured as channel characteristics higher than a first threshold value to all subcarriers, the ratio B of the pilot carriers having a value to be measured as channel characteristics higher than a second threshold value to all pilot carriers, and a requested communication quality. However, the transmission conditions may be set using solely the ratio A or B or both of them as the transmission condition setting index(es).

Seventh Embodiment

Figure 10:
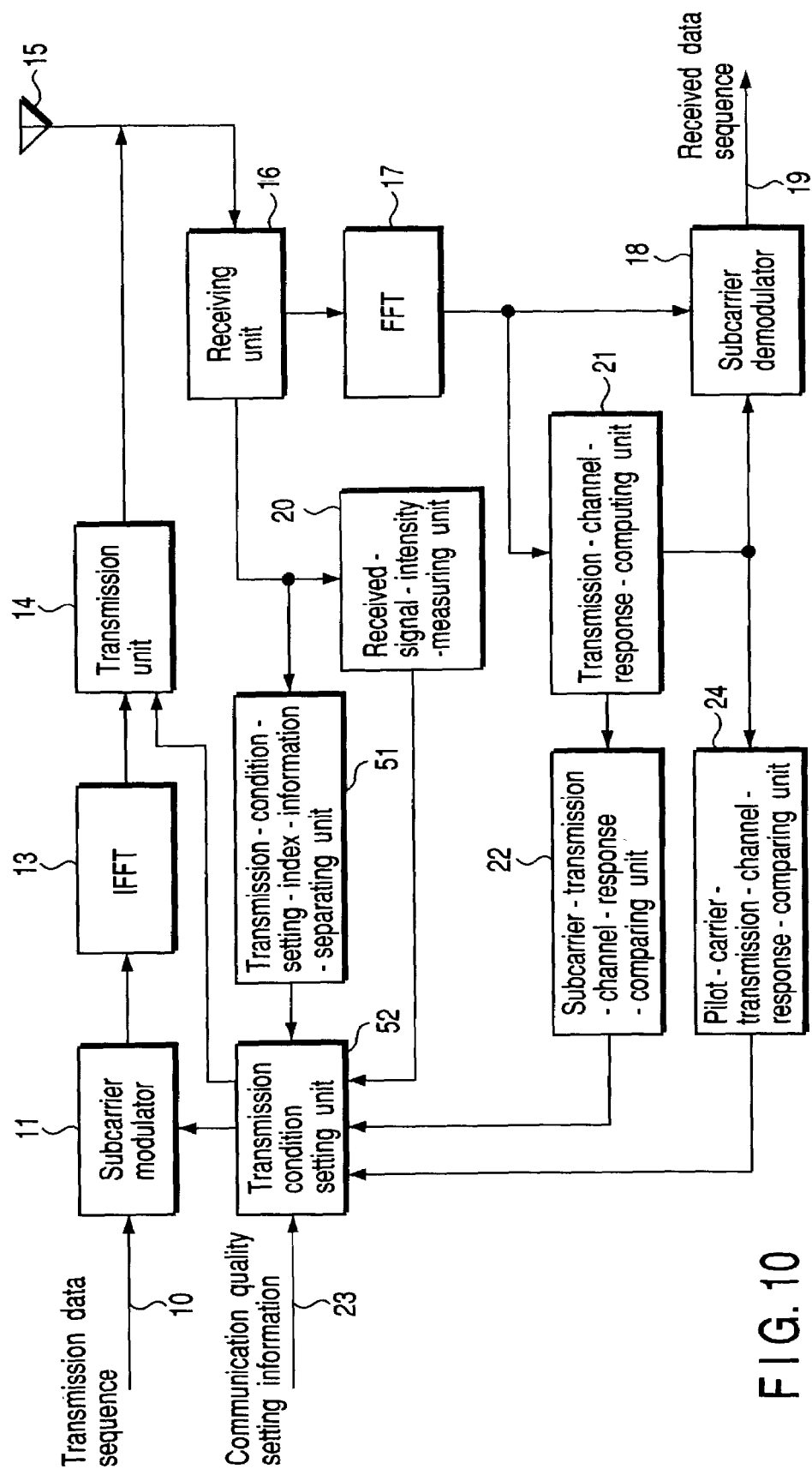
FIG. 10 is a block diagram illustrating an OFDM transmitting and receiving apparatus according to a seventh embodiment of the invention.

FIG. 10 illustrates an OFDM transmitting and receiving apparatus according to a seventh embodiment of the invention. This apparatus is realized by combining the functions of the OFDM transmitting and receiving apparatuses of FIGS. 3 and 9. Specifically, a transmission-condition-setting-index-information separating unit 51 is added to the OFDM apparatus of FIG. 3. Further, a transmission condition setting unit is provided which has a function for setting transmission conditions for the originating apparatus, using, as transmission condition setting index information, the outputs of the received-signal-intensity-measuring unit 20, subcarrier-transmission-channel-response-comparing unit 22, and pilot-carrier-transmission-channel-response-comparing unit 24, which are incorporated in the originating apparatus. The unit 52 also has a function for setting transmission conditions for the originating apparatus based on the transmission condition setting index information transmitted from a destination transmitting and receiving apparatus and separated by the transmission-condition-setting-index-information separating unit 51.

In the seventh embodiment, if the transmission channel response characteristics assumed during transmission from the originating transmitting and receiving apparatus to the destination transmitting and receiving apparatus are substantially the same as those assumed during transmission from the destination apparatus to the originating apparatus, transmission conditions for the originating apparatus are set, as in the third embodiment, using, as transmission condition setting index information, the outputs of the received-signal-intensity-measuring unit 20, subcarrier-transmission-channel-response-comparing unit 22, and pilot-carrier-transmission-channel-response-comparing unit 24.

On the other hand, if the transmission channel response characteristics assumed during transmission from the originating transmitting and receiving apparatus to the destination transmitting and receiving apparatus differ from those assumed during transmission from the destination apparatus to the originating apparatus, transmission conditions for the originating apparatus are set based on an OFDM signal transmitted from the destination apparatus, as in the destination apparatus of FIG. 9 according to the sixth embodiment or as in the apparatus shown in FIG. 10 according to the seventh embodiment. In other words, the transmission conditions for the originating apparatus are set by the transmission condition setting unit 52 based on the transmission condition setting index information separated by the transmission condition setting index information separating unit 51.

Thus, in the seventh embodiment, optimal transmission conditions can be set irrespective of whether or not the transmission channel response characteristics between the originating and destination apparatuses are identical. Further, as a modification of the seventh embodiment, the transmission conditions may be set using, as the transmission condition setting index(es), the ratio A of the subcarriers having a value to be measured as channel characteristics higher than a first threshold value to all subcarriers, or the ratio B of the pilot carriers having a value to be measured as channel characteristics higher than a second threshold value to all pilot carriers, or both of the ratios A and B.

By virtue of the above-described configurations, the transmission conditions can be set in accordance with the transmission channel response characteristics of each transmission channel, thereby increasing the effective data transmission rate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An OFDM transmitting and receiving apparatus which transmits and receives an OFDM signal including a plurality of subcarriers to and from a destination transmitting and receiving apparatus, the subcarriers being transmitted via respective predetermined transmission channels, comprising:
    a receiving unit configured to receive an OFDM signal transmitted from the destination transmitting and receiving apparatus;
    a computing unit configured to compute a value of a channel response characteristic of each of transmission channels corresponding to subcarriers contained in the OFDM signal received, and obtain a computed value;
    a comparing unit configured to compare the computed value with a predetermined threshold value, and compute a ratio of the number of the subcarriers including the value of the channel response characteristic higher than the predetermined threshold value, to the number of all the subcarriers, and obtain a computed ratio;
    a setting unit configured to set a transmission condition based on at least the computed ratio; and
    a transmitting unit configured to transmit an OFDM signal based on the transmission condition set.

2. The OFDM transmitting and receiving apparatus according to claim 1, wherein:
    the computing unit computes the value of the channel response characteristic of each of transmission channels corresponding to known subcarriers contained in data symbols included in the OFDM signal received, and obtains a first computed value; and
    the comparing unit includes a first comparing unit configured to compare the first computed value with a predetermined threshold value, and compute a ratio of the number of the known subcarriers including the value of the channel response characteristic higher than the predetermined threshold value, to the number of all the known subcarriers.

3. The OFDM transmitting and receiving apparatus according to claim 1, wherein:
    the computing unit computes the value of the channel response characteristic of each of transmission channels corresponding to known subcarriers contained in preambles included in the OFDM signal received, and obtains a second computed value; and
    the comparing unit includes a second comparing unit configured to compare the second computed value with a predetermined threshold value, and compute a ratio of the number of the known subcarriers including the value of the channel response characteristic higher than the predetermined threshold value, to the number of all the known subcarriers.

4. The OFDM transmitting and receiving apparatus according to claim 1, wherein the setting unit sets, as the transmission condition, at least one of a modulation form, a coding rate used in error correction coding, a packet length and transmission power.

5. The OFDM transmitting and receiving apparatus according to claim 1, further comprising a measuring unit configured to measure an intensity of the OFDM signal received, and wherein the setting unit sets the transmission condition based on the received-signal intensity measured.

6. The OFDM transmitting and receiving apparatus according to claim 1, further comprising a measuring unit configured to measure an intensity of the OFDM signal received, and wherein the setting unit sets the transmission condition based on the received-signal intensity measured and a requested communication quality.

7. The OFDM transmitting and receiving apparatus according to claim 1, wherein the comparing unit compares at least one of an amplitude, power and distortion corresponding to the value of the channel response characteristic with the predetermined threshold value.

8. The OFDM transmitting and receiving apparatus according to claim 1, wherein:
the computing unit computes a first set of values of channel response characteristics corresponding to known subcarriers contained in data symbols included in the OFDM signal received, and also computes a second set of values of channel response characteristics corresponding to known subcarriers contained in preambles included in the OFDM signal received; and
the comparing unit compares the first set of values with a first predetermined threshold value, and computes a ratio of the number of the known subcarriers including a value of the first set higher than the first predetermined threshold value, to the number of all the known subcarriers, and the comparing unit also compares the second set of values with a second predetermined threshold value, and computes a ratio of the number of the known subcarriers including a value of the second set higher than the second predetermined threshold value, to the number of all the known subcarriers; and
the setting unit sets the transmission condition based on at least the ratios computed based on the value of the first set and the value of the second set.

9. The OFDM transmitting and receiving apparatus according to claim 8, wherein the comparing unit compares at least one of an amplitude, power and distortion corresponding to the value of the first set and the value of the second set with the first predetermined threshold value and the second predetermined threshold value, respectively.

10. The OFDM transmitting and receiving apparatus according to claim 1, wherein:
the computing unit computes a first set of values of channel response characteristics corresponding to known subcarriers contained in data symbols included in the OFDM signal received, and also computes a second set of values of channel response characteristics corresponding to the subcarriers included in the OFDM signal received; and
the comparing unit compares the first set of values with a first predetermined threshold value, and computes a ratio of the number of the known subcarriers including a value of the first set higher than the first predetermined threshold value, to the number of all the known subcarriers, and the comparing unit also compares the second set of values with a second predetermined threshold value, and computes a ratio of the number of the subcarriers including a value of the second set higher than the second predetermined threshold value, to the number of all the subcarriers; and
the setting unit sets the transmission condition based on at least the ratios computed based on the value of the first set and the value of the second set.

11. The OFDM transmitting and receiving apparatus according to claim 10, wherein the comparing unit compares at least one of an amplitude, power and distortion corresponding to the value of the first set and the value of the second set with the first predetermined threshold value and the second predetermined threshold value, respectively.

12. An OFDM transmitting and receiving apparatus which transmits and receives an OFDM signal including a plurality of subcarriers to and from a destination transmitting and receiving apparatus, the subcarriers including respective transmission channel responses, comprising:
a receiving unit configured to receive an OFDM signal transmitted from the destination transmitting and receiving apparatus;
a computing unit configured to compute a value of a channel response characteristic of each of transmission channels corresponding to subcarriers contained in the OFDM signal received, and obtain a computed value;
a comparing unit configured to compare the computed value with a predetermined threshold value, and compute a ratio of the number of the subcarriers including the value of the channel response characteristic higher than the predetermined threshold value, to all the subcarriers;
a generating unit configured to generate transmission condition setting information which determines a transmission condition which the destination transmitting and receiving apparatus needs when the destination transmitting and receiving apparatus transmits information to the OFDM transmitting and receiving apparatus based on at least the ratio computed by the comparing unit; and
a transmitting unit configured to transmit the transmission condition setting information to the destination transmitting and receiving apparatus.

13. The OFDM transmitting and receiving apparatus according to claim 12, wherein:
the computing unit computes the value of the channel response characteristic corresponding to known subcarriers contained in data symbols included in the OFDM signal received, and obtains a first computed value; and
the comparing unit includes a first comparing unit configured to compare the first computed value with a predetermined threshold value, and compute a ratio of the number of the known subcarriers including the value of the channel response characteristic higher than the predetermined threshold value, to the number of all the known subcarriers.

14. The OFDM transmitting and receiving apparatus according to claim 12, wherein:
the computing unit computes the value of the channel response characteristic of each of transmission channels corresponding to known subcarriers contained in preambles included in the OFDM signal received, and obtains a second computed value; and
the comparing unit includes a second comparing unit configured to compare the second computed value with a predetermined threshold value, and compute a ratio of the number of the known subcarriers including the value of the channel response characteristic higher than the predetermined threshold value, to the number of all the known subcarriers.

15. The OFDM transmitting and receiving apparatus according to claim 12, wherein the comparing unit compares at least one of an amplitude, power and distortion corresponding to the value of the channel response characteristic with the predetermined threshold value.

16. The OFDM transmitting and receiving apparatus according to claim 12, wherein:
the computing unit computes a first set of values of channel response characteristics corresponding to known subcarriers contained in data symbols included in the OFDM signal received, and also computes a second set of values of channel response characteristics corresponding to known subcarriers contained in preambles included in the OFDM signal received; and
the comparing unit compares the first set of values with a first predetermined threshold value, and computes a ratio of the number of the known subcarriers including a value of the first set higher than the first predetermined threshold value, to the number of all the known subcarriers, and the comparing unit also compares the second set of values with a second predetermined threshold value, and computes a ratio of the number of the known subcarriers including a value of the second set higher than the second predetermined threshold value, to the number of all the known subcarriers; and
the generating unit generates transmission condition setting information which determines a transmission condition which the destination transmitting and receiving apparatus needs when the destination transmitting and receiving apparatus transmits information to the OFDM transmitting and receiving apparatus based on at least the ratio computed from the channel response characteristics corresponding to known subcarriers contained in data symbols and the channel response characteristics corresponding to known subcarriers contained in preambles.

17. The OFDM transmitting and receiving apparatus according to claim 16, wherein the comparing unit compares at least one of an amplitude, power and distortion corresponding to the value of the first set and the value of the second set with the first predetermined threshold value and the second predetermined threshold value, respectively.

18. The OFDM transmitting and receiving apparatus according to claim 12, wherein:
the computing unit computes a first set of values of channel response characteristics corresponding to known subcarriers contained in data symbols included in the OFDM signal received, and also computes a second set of values of channel response characteristics corresponding to the subcarriers included in the OFDM signal received; and
the comparing unit compares the first set of values with a first predetermined threshold value, and computes a ratio of the number of the known subcarriers including a value of the first set higher than the first predetermined threshold value, to the number of all the known subcarriers, and the comparing unit also compares the second set of values with a second predetermined threshold value, and computes a ratio of the number of the subcarriers including a value of the second set higher than the second predetermined threshold value, to the number of all the subcarriers; and the generating unit generates transmission condition setting information which determines a transmission condition which the destination transmitting and receiving apparatus needs when the destination transmitting and receiving apparatus transmits information to the OFDM transmitting and receiving apparatus based on at least the ratio computed from the value of the first set and the value of the second set.

19. The OFDM transmitting and receiving apparatus according to claim 18, wherein the comparing unit compares at least one of an amplitude, power and distortion corresponding to the value of the first set and the value of the second set with the first predetermined threshold value and the second predetermined threshold value, respectively.

20. An OFDM transmitting and receiving apparatus which transmits and receives an OFDM signal including a plurality of subcarriers to and from a destination transmitting and receiving apparatus, the subcarriers including respective transmission channel responses, comprising:
a receiving unit configured to receive an OFDM signal transmitted from the destination transmitting and receiving apparatus;
a computing unit configured to compute a value of a channel response characteristic of each of transmission channels corresponding to subcarriers contained in the OFDM signal received, and obtain a computed value;
a comparing unit configured to compare the computed value with a predetermined threshold value, and compute a ratio of the number of the subcarriers including the value of the channel response characteristic higher than the predetermined threshold value, to all the subcarriers;
an integrating unit configured to integrate information of transmission condition setting indexes based on at least the ratio computed by the comparing unit, the transmission condition setting indexes being referred to set a transmission condition which the destination transmitting and receiving apparatus needs when the destination transmitting and receiving apparatus transmits information to the OFDM transmitting and receiving apparatus; and
a transmitting unit configured to transmit the information of the transmission condition setting indexes to the destination transmitting and receiving apparatus.

* * * * *